United States Patent [19]
Kaeser

[11] Patent Number: 5,897,636
[45] Date of Patent: Apr. 27, 1999

[54] DISTRIBUTED OBJECT COMPUTER SYSTEM WITH HIERARCHICAL NAME SPACE VERSIONING

[75] Inventor: Reto Kaeser, Mutschellen, Switzerland

[73] Assignee: Tandem Corporation Incorporated, Cupertino, Calif.

[21] Appl. No.: 08/678,791

[22] Filed: Jul. 11, 1996

[51] Int. Cl.$^6$ .................................................. G06F 17/30
[52] U.S. Cl. .................... 707/100; 707/10; 707/203; 707/200
[58] Field of Search ............................. 707/10, 100, 103, 707/8, 200, 203

[56] References Cited

U.S. PATENT DOCUMENTS

| | | | |
|---|---|---|---|
| 5,535,386 | 7/1996 | Wang | 707/203 |
| 5,603,027 | 2/1997 | Ohkami | 707/203 |
| 5,664,177 | 9/1997 | Lowry | 707/100 |

*Primary Examiner*—Thomas G. Black
*Assistant Examiner*—Greta L. Robinson
*Attorney, Agent, or Firm*—Graham & James LLP

[57] ABSTRACT

The present invention is a method and apparatus for providing a hierarchical networked database which supports multiple versions of the same underlying data. Structurally, the present invention is based on hierarchical tree-like structure known which includes one or more nodes connected by labeled branches. Any node in the tree may be reached by specifying a sequence of names which correspond to the branch labels between the root node and the desired node. The root node contains one or more name/attribute pairs which define an initial revision. Each descendent node inherits the revision defined by its ancestors and forms a new revision by including the changed name/attribute pairs which differ from the inherited revision. In this way, a particular revision is defined to be the changed name/attribute pairs contained in a node and the most recent instance of each unchanged name/attribute pair contained in the node's ancestors.

11 Claims, 6 Drawing Sheets

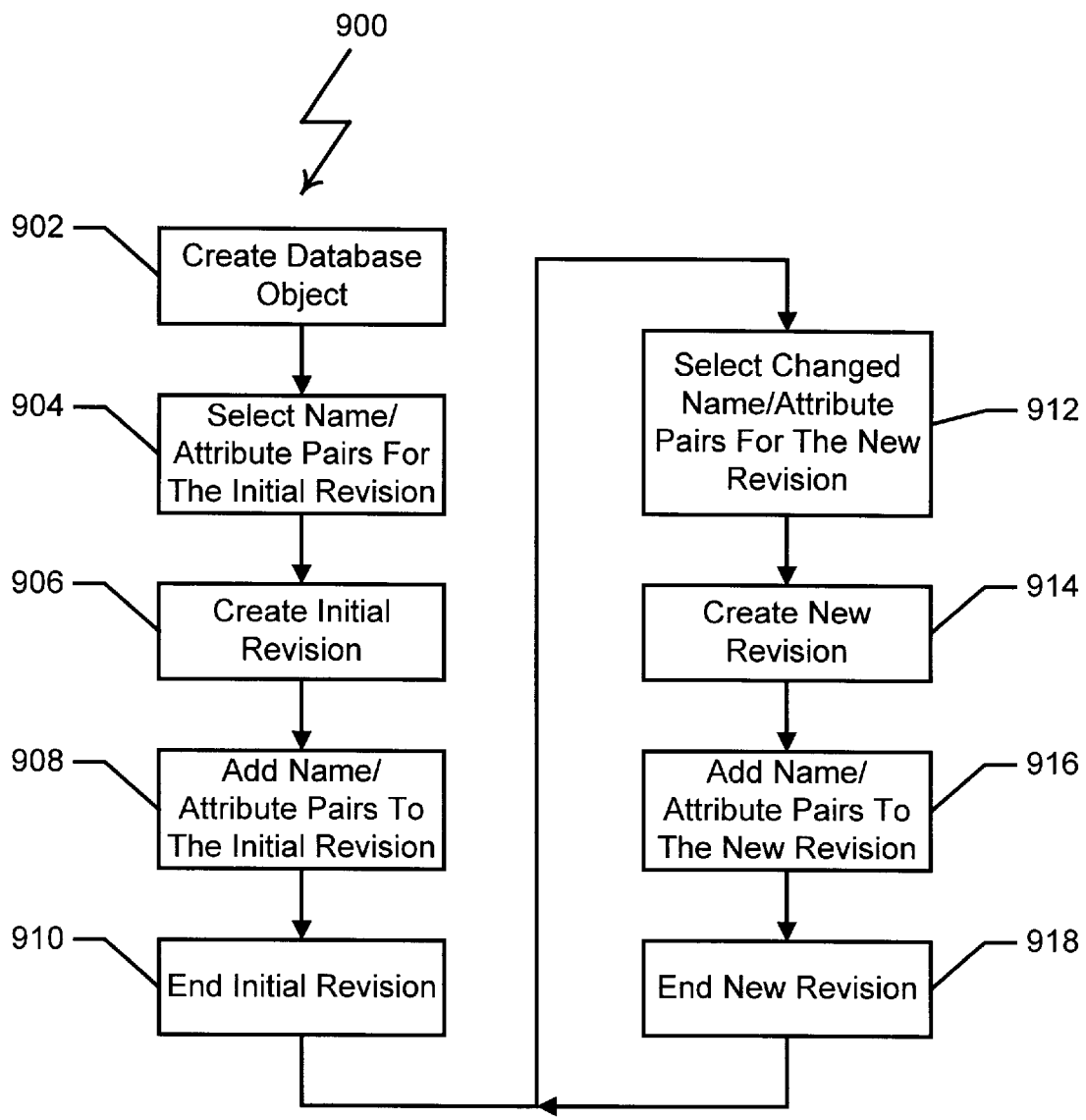

DISTRIBUTED OBJECT COMPUTER SYSTEM WITH HIERARCHICAL NAME SPACE VERSIONING

RELATED APPLICATIONS

The following related U.S. applications are hereby incorporated by reference: U.S. Application Ser. No. 08/680,270 (attorney docket number 23896.231) entitled "Method and Apparatus for Describing an Interface Definition Language-Defined Interface, Operation, and Data Type" by A. Schofield, filed Jul. 11, 1996; U.S. Application Ser. No. 08/678,681 (attorney docket number 23896.232) entitled "Method and Apparatus Using Parameterized Vectors For Converting Interface Definition Language-Defined Data Structures into a Transport and Platform Independent Format" by A. Schofield, filed Jul. 11, 1996; U.S. Application Ser. No. 08/678,298 (attorney docket number 23896.233) entitled "Data Structure Representing An Interface Definition Language Source File" by A. Schofield, filed Jul. 11, 1996; U.S. Application Ser. No. 08/680,203 (attorney docket number 23896.234) entitled "Method And Apparatus For Transporting Interface Definition Language-Defined Data Structures Between Heterogeneous Systems" by A. Schofield filed Jul. 11, 1996; U.S. Application Ser. No. 08/678,295 (attorney docket number 23896.235) entitled "Method and Apparatus for Performing Distributed Object Calls" by A. Schofield filed Jul. 11, 1996; U.S. Application Ser. No. 08/680,202 (attorney docket number 23896.236) entitled "Method and Apparatus for Asynchronously Calling and Implementing Objects" by A. Schofield, filed Jul. 11, 1996; U.S. Application Ser. No. 08/680,266 (attorney docket number 23896.237) entitled "Method and Apparatus for Performing Distributed Object Calls using Proxies and Memory Allocation" by A. Schofield filed Jul. 11, 1996.

FIELD OF THE INVENTION

The present invention relates to the provision of database services within a networked computer systems. More particularly, the present invention is a method and apparatus for providing a hierarchical networked database which supports multiple versions of the same underlying data.

BACKGROUND OF THE INVENTION

Heterogeneous computer networks are networks where dissimilar computer systems are inter-linked to provide a range of services. For example, the network represented by the world wide web is composed of many different computer types which utilize many different types of operating systems and many different communication protocols. There are, not unexpectedly, complex problems which must be resolved when groups of dissimilar computers are linked in a heterogeneous network. Many of these problems result from the difficulty which is associated with the design and implementation of standardized interfaces which allow software processes to share data and information between dissimilar computer systems.

Distributed object computing is a method for providing standardized interfaces between the computers of a heterogeneous network. The interfaces define ways in which software processes may communicate to share information and services with other software processes executing on remote computer systems. To provide this type of functionality, distributed object computing borrows many of the fundamental ideas of object oriented programming, or "OOP", and applies them to the problems of computer networking.

For a distributed object computing system, a programmer defines services and information in terms of objects. Objects are collections of data elements and associated methods, or procedures, for manipulating the data elements. Typically, some or all of the data elements within an object will be "private" meaning that they may only be manipulated using the methods defined for the object. In this way, objects are a convenient tool for defining data types and providing an interface for manipulating the data types. Distributed object computing systems utilize this methodology by defining information and services available on a computer network in terms of objects. When a client system needs access to a particular service, it manipulates an object associated with that service by performing what is know as an "object call." The object call is transmitted to the server that implements the methods associated with the called object. The server then carries out the requested operation and returns the operation's result.

In all computer networks, there is a great deal of shared information which is generally stored in a multitude of locations within the network. For example, a great deal of shared information exists which describes the configuration of the network and the various systems within the network. Increasingly, it has been found to be advantageous to store this information in one or more common repositories. For example, passwords, which, in the past, might have been stored in numerous files on numerous systems, are now increasingly stored in a networked database accessible to all computer systems on a single network.

Unfortunately, practice has demonstrated that the task of providing a networked database system involves much more than simply moving all such data to a centralized location. For example, it is clearly the case that, to be effective, a networked database much provide some type of organization. Generally, this involves the ability to group similar data logically and to provide a simplified mechanism for retrieving information based on this logical grouping. Networked databases must also be able to provide rapid access to their underlying data. As an example, in a distributed object computing system, it may be desirable to use a networked database as a means for maintaining information which maps names to actual objects. Systems which need to access an object would find the object, using the object's name, in the networked database. If this operation were time consuming, the efficiency of the entire network would suffer.

It is also the case that an effective networked database must provide some type of revision control. This follows from the observation that not all information within a networked database will be applicable or appropriate for all systems within a single computer network. For example, computers within a single network may utilize different versions of the same software package. As a result, it is important that a networked configuration database be able to supply appropriate revisions to individual systems. Ideally, this versioning ability should be both referential (i.e. it should provide for the inspection of older versions) and restorative (the ability to retrieve older versions should be provided).

Finally, in a distributed object computing system, an effective networked database must provide the type of interface which is expected for all services within the network. Namely, the networked database must provide an object oriented interface.

SUMMARY OF THE INVENTION

The present invention is a method and apparatus for providing a hierarchical networked database which supports multiple versions of the same underlying data. Structurally, the present invention is based on hierarchical tree-like structure known as a naming graph. At each level of the naming graph there are one or more nodes. Each node (except the node located at the root of the naming graph) has one parent node. Additionally, each node may have an unlimited number of descendent nodes. Nodes are connected to their parent node and their descendent nodes by labeled branches.

The combination of nodes and labeled branches means that any node within the naming graph may be reached by specifying a series of names. For example, starting at the root node, the name of the desired branch is selected. This branch is followed to reach one of the descendants of the root node. At the descendent node, a second name is used to select another desired branch leading, in turn, to a descendent of the descendent node. This process may be repeated an arbitrary number of times to reach nodes at any level within the naming graph. The series of names used to reach a particular node is referred to as the context name of the node.

Within each node there may be an unlimited number of attributes, each bound to a name. Each attribute may be selected by specifying its name within its containing node. Alternatively, any attribute may be reached by specifying the context of the node containing the attribute and the name of the attribute within the node. This series of names, which includes the names used to reach the node and the name of the attribute within the node is referred to collectively as the compound name.

In this fashion, the present invention provides a method and apparatus which allows data to be divided into logical groups and stored in a hierarchical fashion. This basic framework is also used by the present invention to allow revisions of data to be stored and later examined or retrieved. More specifically, to use a naming graph as a versioning database, a set of names and attributes are used to define an initial revision or version. These names and attributes are stored in the root node of a naming graph. At the next level of the naming graph, there are one or more descendent nodes. Each of these descendent nodes is used to define a revision to the names and attributes stored in the root node. This is accomplished by having each descendent node store the names and attributes that have changed between the version defined using the descendent node and the initial version defined by the root node. The revision associated with each node is defined to be the changed names and attributes contained in the node, as well as the most recent instance of each unchanged name and attribute. In the case of nodes which are direct descendants of the root node, the most recent instance of each unchanged name and attribute will always be found in the root node itself.

The relationship between the root node and its direct descendants is continued throughout the naming graph. Therefore, each node in the naming graph is used to define a particular revision by storing each name and attribute that has changed between the revision defined by the node and the revision defined by the node's ancestors. The revision associated with each node is defined to be the changed names and attributes contained in the node, as well as the most recent instance of each unchanged name and attribute. In the case of nodes which are not direct descendants of the root node, locating the most recent instance of an unchanged name or attribute generally involves examining, in succession, each of the node's ancestors until a node is located which contains the required name or attribute.

To create a revisioning naming graph, a user calls a method which creates the object that represents the naming graph. Creation of the naming graph object is followed by the creation of each node, or revision, within the naming graph. To create a node, or revision, within a naming graph object, the user first defines a symbolic name known as a variant. The user then calls the method for creating a new revision passing, as parameters, a reference to the node which is to be the parent of the new revision, and the variant. The method creates a new node, or revision, within the naming graph which descends from the specified parent and is symbolically associated with the variant which the user has defined.

Once the new node has been created, the user is free to add new names and attributes to the node. These new names and attributes will, of course, override any definitions of the same names and attributes which appear in the ancestors of the newly created revision. Once the process of adding names and attributes to the newly created revision is complete, the user calls a function which indicates to the naming graph object that the new revision is complete. At this point the new variant, and thus the new revision, becomes available for general use. It should be noted that the contents of a node, or revision, are static and cannot be changed after the revision has been completed.

In the method for node creation just described, the parent of a new revision is fixed at the time of creation for the revision. This is known, in the present invention, as a precursor/successor relationship and is, for many cases, the desired result. There are other cases, however, when it may be more convenient to define the parent of a revision in a dynamic fashion. For example, stored information may, in some cases, represent a master template. Revisions of the master template may contain information that augments the master template for a certain context. In these cases, it is often useful to modify the data in the master template and to have those modifications be visible to users of the augmenting revisions. If a precursor/successor relationship is used however, this fails because modifications to the master template result in an entirely new revision which contains the modified data but is not the parent of the augmenting revisions.

For these situations the present invention allows the creator of a revision to specify that an alternate base/dependent relationship be used. The functional differences between precursor/successor and base/dependent relationships are easier to understand if it is remembered that a variant is a symbolic name for a particular node or revision. In a base/dependent relationship, the base variant is the variant of the parent node, and the dependent variant is the variant of the descendent node. When the base/dependent relationship is used, the parent of the dependent node is defined to be the node that the base variant is associated with. The result is that the parent of the dependent node may be dynamically changed by associating the base variant with a different node. For the case of a node which acts as a master template, this allows a new revised template and associated with a base variant. The augmenting revisions (dependent nodes) are then dynamically reassigned as descendants of the new master template.

Advantages of the present invention will become more fully apparent when the following detailed descriptions of the invention are read in conjunction with the accompanying drawings.

BRIEF DESCRIPTION OF THE DRAWINGS

The invention will now be described with reference to the accompanying drawings, wherein:

FIG. 9 is flowchart of the method of the present invention for constructing a revisioning database.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
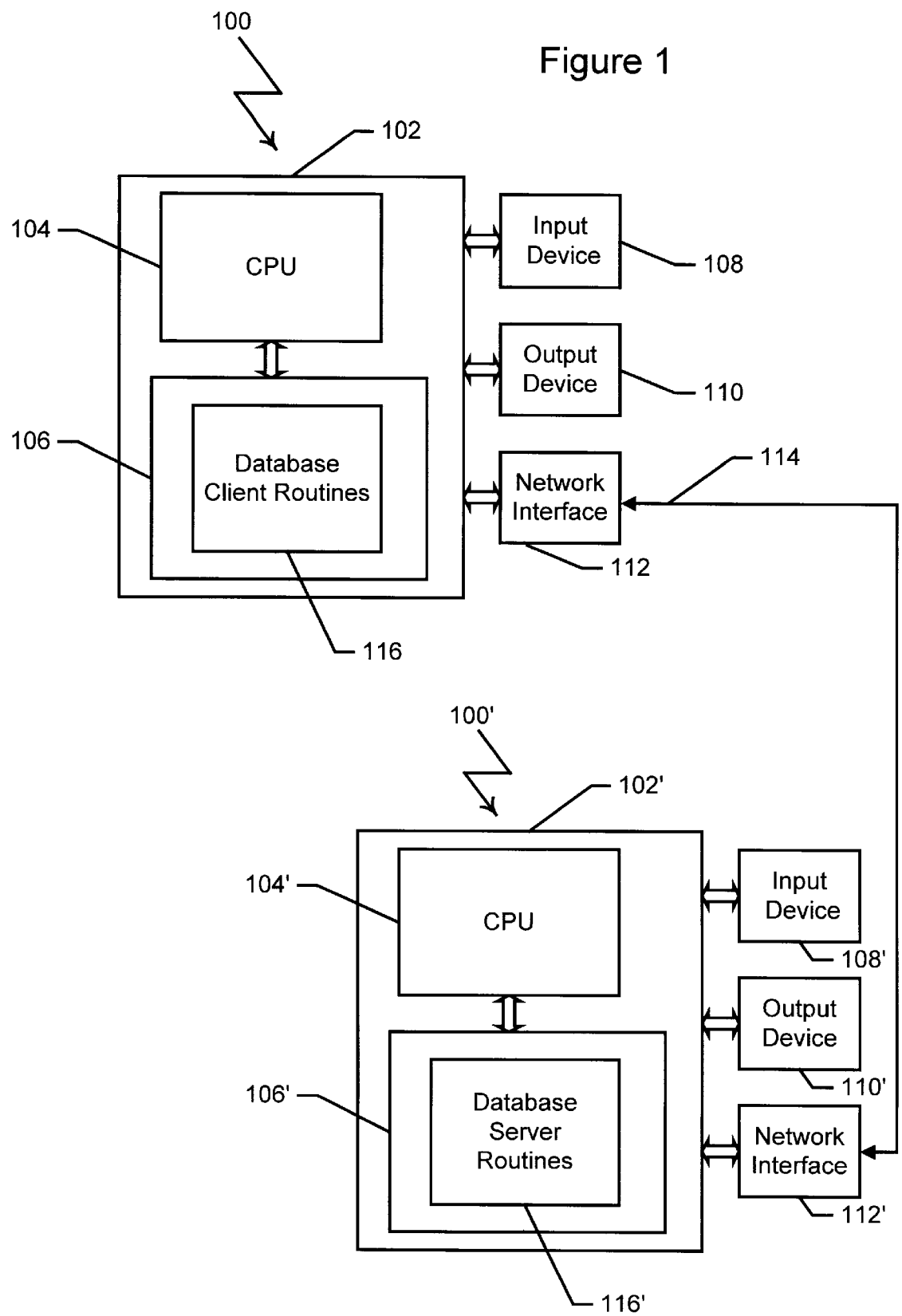
FIG. 1 is a block diagram of a data processing system in accordance with a preferred embodiment of the present invention.

The present invention is a method and apparatus for providing a hierarchical networked database which supports multiple versions of the same underlying data. In FIG. 1, a data processing system 100 is shown as a representative environment for the present invention. Structurally, the data processing system 100 includes a host computer 102 which, in turn, includes a central processing unit, or CPU, 104 and a memory 106. An input device 108 and an output device 110 are connected to the host computer 102 and represent a wide range of varying I/O devices such as keyboards, modems, disk drives, printers and displays. FIG. 1 also shows that data processing system 100 includes a network interface 112 and that network interface 112 is connected, in turn to a network 114.

A second data processing system 100' is also connected to the network 114. As shown second data processing system 100' is substantially similar to data processing system. The two systems differ, however, with respect to the contents of memory 106 and 106'. More specifically, FIG. 1 shows that database client routines 116 are loaded into memory 106 of system 100. This identifies system 100 as a network client. On the other hand, database server routines 116' are loaded into memory 106' of system 100'. This identifies system 100 as a network server. For the sake of simplicity data processing system 100 will therefore be referred to as client system 100 and data processing system 100' will be referred to as server 100'. Importantly, although FIG. 1 shows client 100 and server 100' to be substantially similar systems, the present invention is specifically directed at heterogeneous computer networks which include dissimilar clients and servers. It should also be noted that the present invention is equally applicable to peer-to-peer networks where each system can simultaneously act as a client or server.

Figure 2:
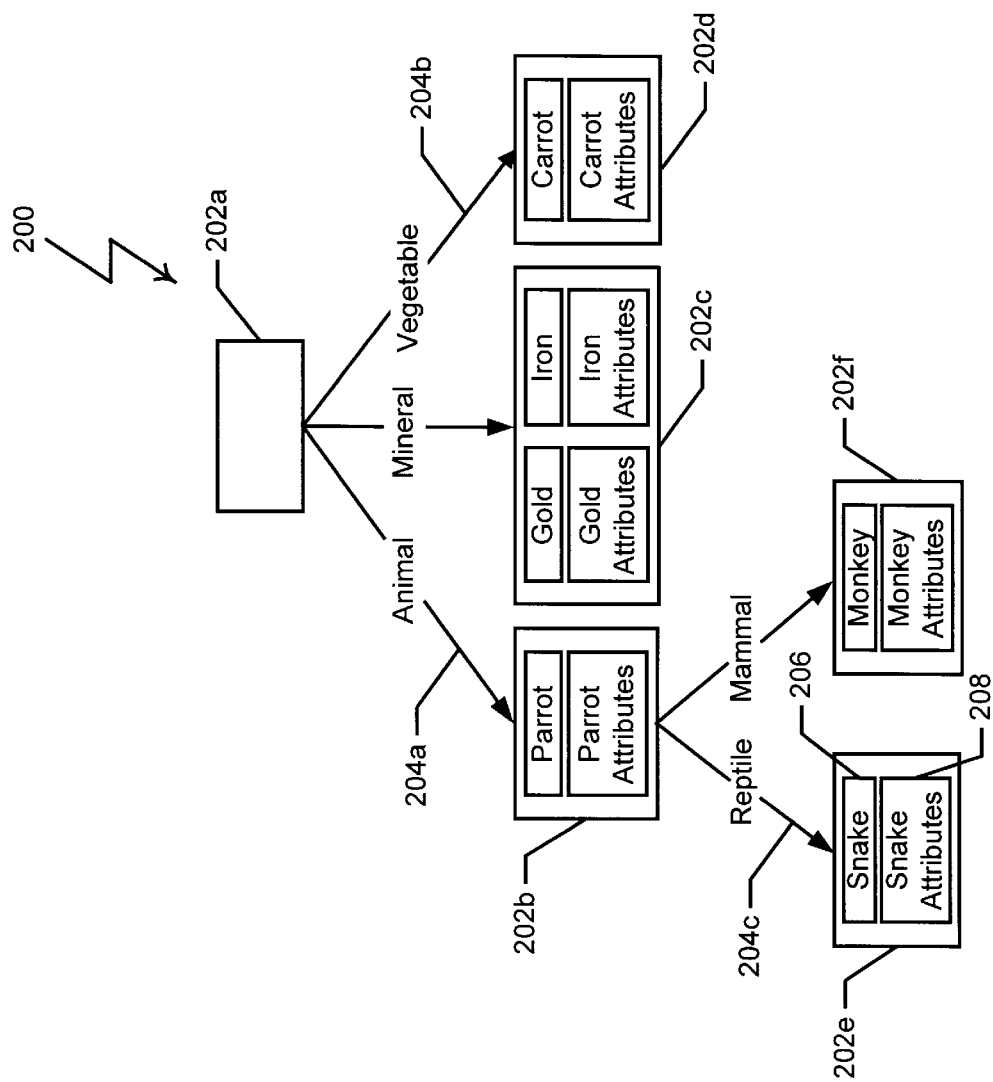
FIG. 2 is a naming graph according to the present invention.

The details of the present invention are best appreciated by brief reference to FIG. 2 where the naming graph of the present invention is shown and generally designated 200. Structurally, it may be seen that naming graph 200 is a hierarchical tree-like data structure which includes one or more nodes, of which node 202a through 202f are representative. Each node (except the root node 202a) has one parent node. For example, the parent of node 202b is the root node 202a. Each node 202 may also have descendent nodes. Node 202b, for example, is a descendent of the root node 202a. In general, there is no limit to the number of nodes 202 which may be descents of a given node 202. Each node 202 is connected to its parent node 202 and descendent nodes 202 by branches, of which branch 204a, 204b and 204c are representative. Each branch 204 has a label. Thus, branch 204a is labeled "animal."

The combination of nodes 202 connected by labeled branches 204 allows any node 202 within the naming graph 200 to be reached using a compound name. For example, in the case of the naming graph 200 of FIG. 2, the node 202e may be reached by using the compound name "/animal/reptile." Similarly, the node 202f may be reached using the compound name "/animal/mammal." The compound name used to reach a particular node 202 is referred to as the context name of the node 202.

Within each node 202 there may be an unlimited number of attributes, each bound to a name. A name/attribute pair of this type is shown specifically for node 202e which includes name 206 and attribute 208. Each attribute 208 may be selected by specifying its name 206 within its containing node 202. In the case of node 202e, attribute 208 may be selected by specifying the name 206 which is bound to the attribute 208. Alternatively, any attribute 208 may be selected by creating a compound name which includes the name 206 of the attribute 208 to be selected. In the case of the attribute 208 of the node 202e, the appropriate compound name would be "/animal/reptile/snake." Use of this compound name would return the attribute 208 bound to the name "snake" 206 within the node 202e.

The naming graph 200 of FIG. 2 provides an apparatus which allows data, in the form of attributes 208, to be divided into logical groups and stored in a hierarchical fashion. This basic methodology may also be used to construct a versioning database, such as the versioning database 300 of FIG. 3. In more detail, it may be seen that the versioning database 300 includes a root node 302 which corresponds generally to the root node 202 of FIG. 2. Root node 302 contains three items, 304a, 304b and 304b, each of which is a name/attribute pair of the type described in combination with FIG. 2. For the purposes of the present invention, the three items, 304a, 304b and 304c are used to define an initial version or initial revision.

Figure 3:
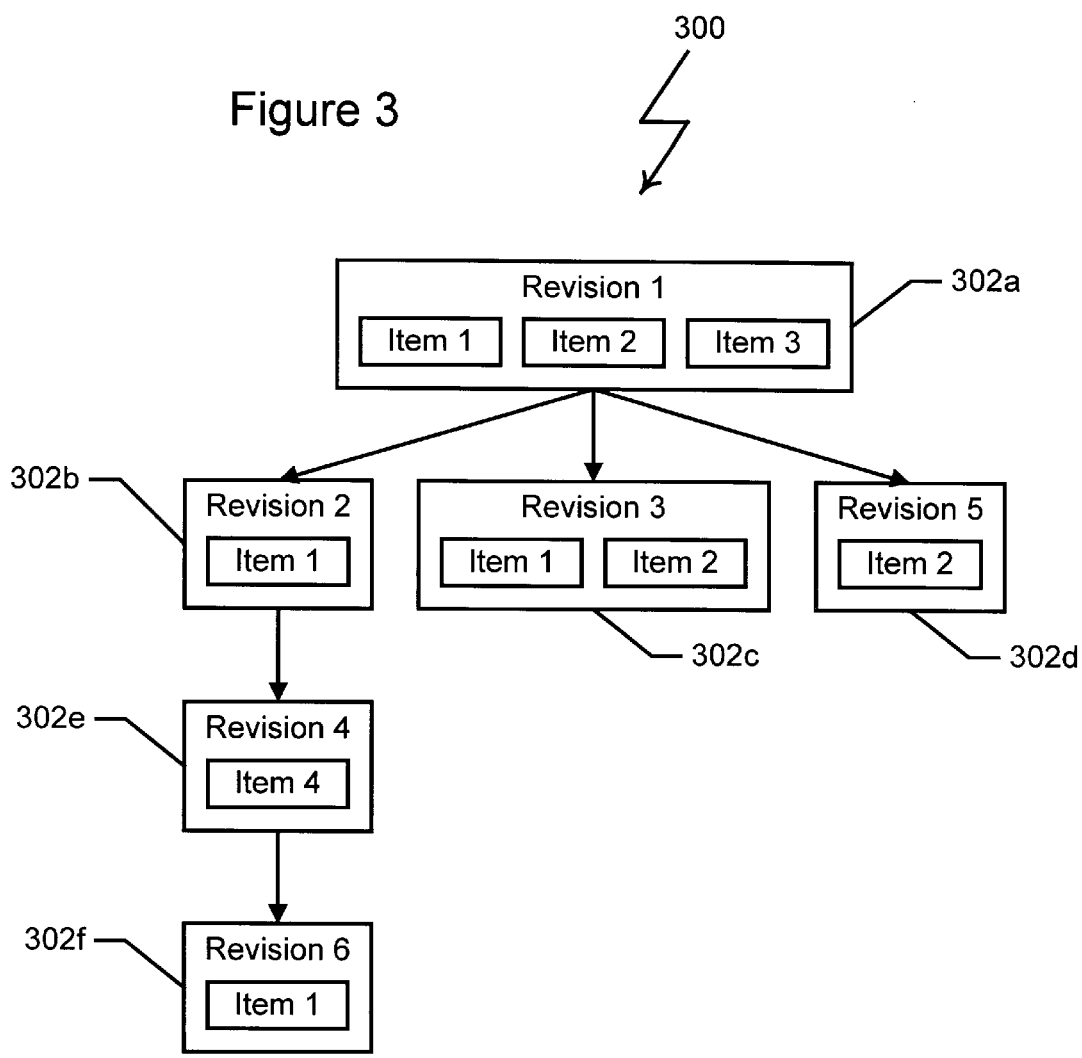
FIG. 3 is a revisioning database according to the present invention.

Continuing with FIG. 3, it may be seen that the naming graph 302 includes a series of nodes, 302b through 302e, which are direct or indirect descendant of the root node 302a. Each of these nodes 302b through 302e are used by the present invention to define a separate revision to the initial revision defined by the three items, 304a, 304b and 304c in the root node 302a. More specifically, for the present invention, each node 302 is assumed to inherit the revision defined by its ancestors. For example, each of the three direct descendants of the root node 302a (i.e. nodes 302b, 302c and 302d) inherit the vision defined by the root node. The inherited revision is then changed by including items 304 in each node which differ from the inherited revision. Taken together, the inherited revision and the items included in a node are used to define a new revision. For example, in the case of node 302b, the inherited revision is the revision defined by the single ancestor to node 302b, namely the root 302a. Referring to FIG. 3, however, it may be seen that Item 304a is included in the node 304b. Therefore, the revision defined using node 302b includes items 304b and 304c from the root node 302a, as well as item 304a from node 304b itself. In a similar fashion, node 302c inherits the revision defined by its ancestors (in this case, the root 302a). Node 302c includes both item 304a and item 304b. The revision defined using node 302c is item 302a and item 302b from node 302c and item 302c taken from the root node 302a.

The concept of inherited revision is applicable to any node 302 in the versioning database 300. It should be appreciated, however, that each node 302 inherits the revision defined by its ancestors. As a result, nodes 302 which are distanced from the root 302a may be used to define revisions which include items 304 taken from the node 302 itself, the root 302a or any node 302 between the node 302 and the root 302a. For example, in the case of node 302e, the inherited revision is defined by ancestors node 302b and the root node 302a. As a result, the inherited revision, includes items 304b and 304c from the root node 302a, and item 304a from node 304b. To this inherited revision, the present invention adds item 304d (a new item) from node 302e. Thus the revision, is defined using node 302e includes four items 304, one taken from node 302e, one taken from the parent of node 302e (node 302b), and one taken from the grandparent of node 302e (the root node 302a).

Figure 4:
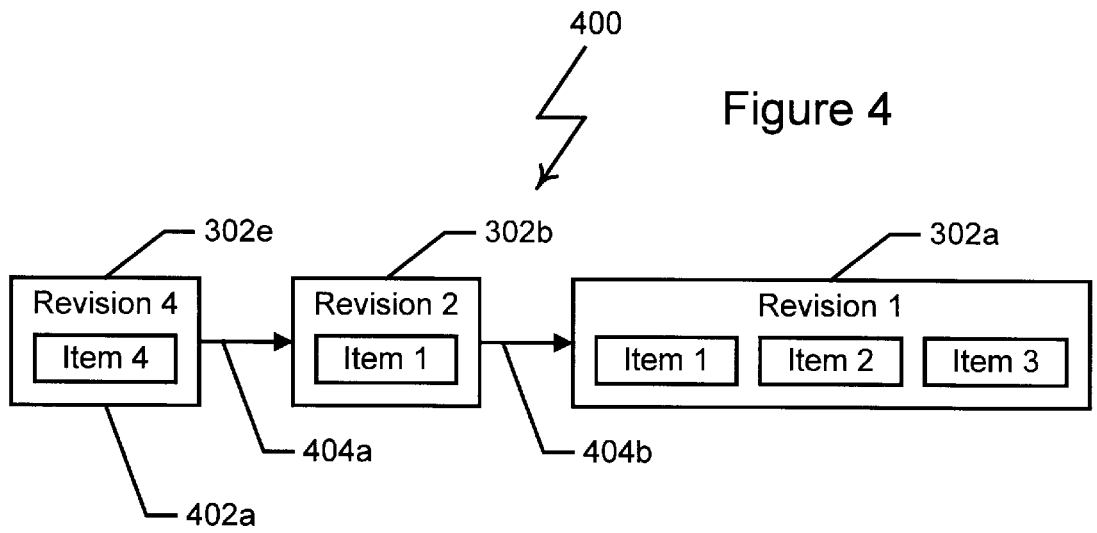
FIG. 4 is an illustration of a revision chain list (RCL).

In effect, the process of defining a particular revision using a particular node 302 involves searching the node 302 for the items 304 which are specifically changed in the revision, and searching backward through the ancestors of the node 302 to find the most recent instance of each item 304 which is not changed by the current revision. This searching is performed using what is know as a revision chain list, or RCL. The RCL which is associated with the revision defined using node 302e of FIG. 3 is shown in FIG. 4 and designated 400. As shown in FIG. 4, the head 402 of RCL 400 may be used to access items 304 which are specifically changed in the revision associated with node 302e. Link 404a provides access to items 304 which are specifically changed in the revision associated with the parent of node 302e, namely node 302b. Finally, link 404b provides access to items 304 which are specifically changed in the revision associated with the grandparent of node 302e, namely node 302a. To find an item 304 which is associated with the revision defined using node 302e, a search is started at the head 402 of the RCL, if the item 304 is not found, link 404a is followed to the revision defined using the parent of node 304e. This process is repeated until the item 304 is found or the end of RCL 400 is reached.

Internally, each revision within the versioning database 300 is marked with a revision number. Revision numbers are monotonicly increasing values which are preferably implemented as unsigned sixty-four bit integers. Each revision is given a revision number at the time the revision is created. In FIG. 3, root node 302a is marked with revision number 1, node 302b is marked with revision number 2, node 302c with revision number 3, and so on. Each revision number is treated as a private, immutable data type. Therefore, users of the versioning database 300 may neither access nor modify the revision number assigned to a particular revision.

Figure 5:
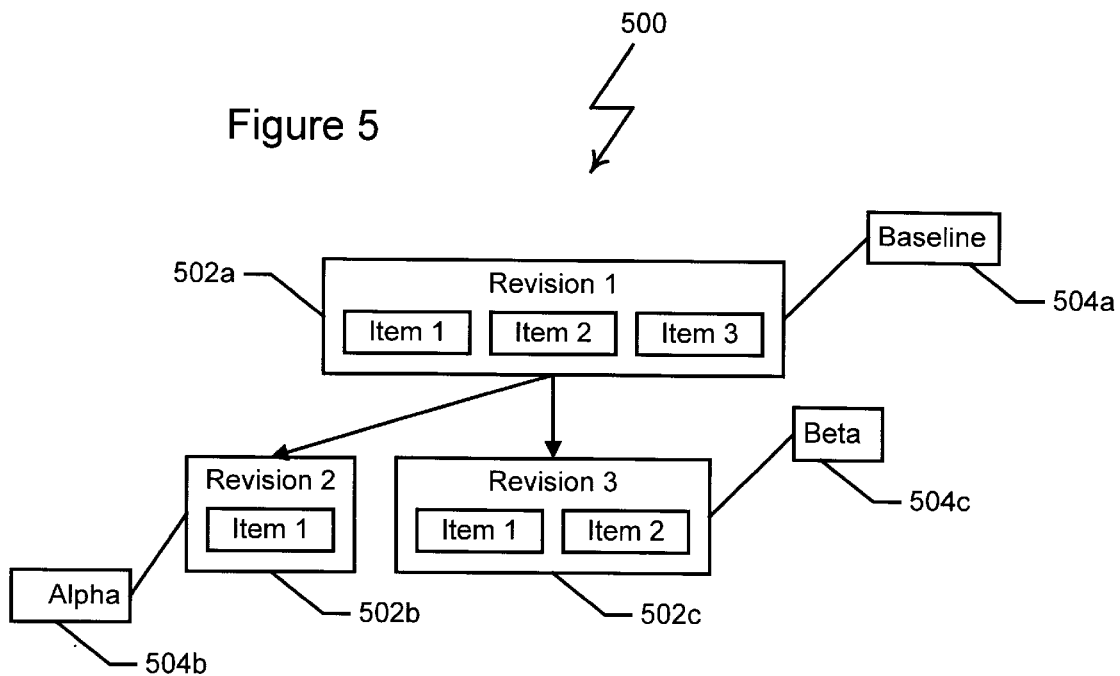
FIG. 5 is a schematic diagram illustrating the relationship of a variant to the revisioning database.

Externally, (i.e. to the users of versioning database 300) revisions are referred to by the use of "variants." Each variant is defined using a name supplied by the user at the time of creation for a particular revision. Thereafter, the variant becomes symbolically associated with the created revision. Use of a variant is shown in FIG. 5. More specifically, in FIG. 5, a versioning database is shown and generally designated 500. Versioning database 500 includes three revisions: an initial revision 502a, and two descendent revisions 502b and 502c. Each revision 502a, 502b and 502c is shown to be associated with a variant, 504a, 504b and 504c respectively. More specifically, it may be seen that the initial revision 502a is associated with a "baseline" variant 504a. Revision 502b is associated with an "alpha" variant 504b. Similarly, Revision 502c is associated with a "beta" variant 504c.

Figure 6:
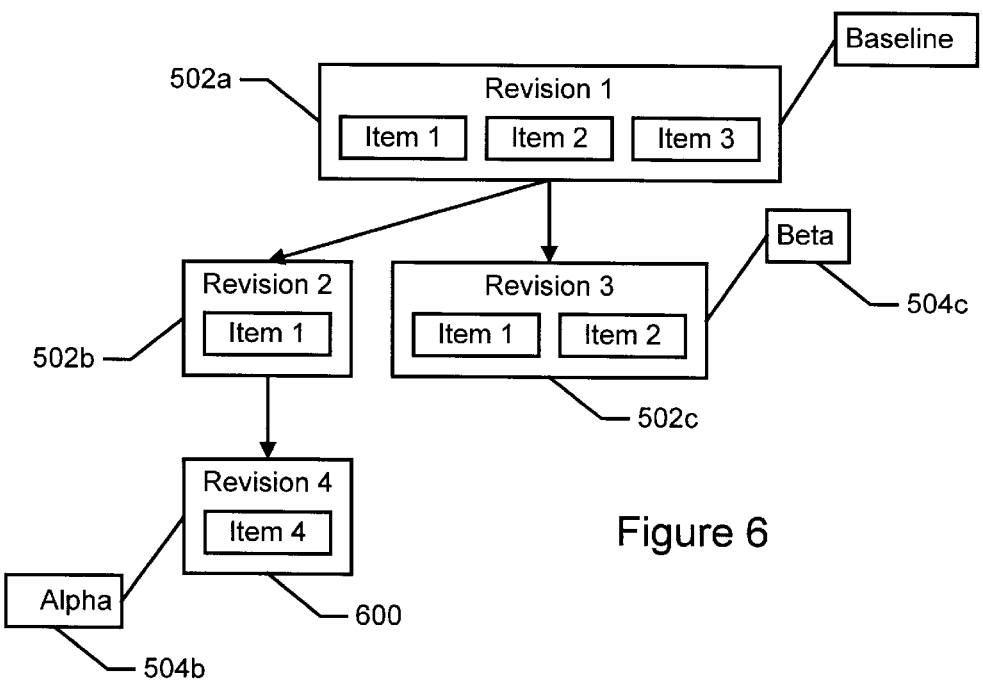
FIG. 6 is a schematic diagram illustrating the effect of reassociating a variant within the revisioning database.

Importantly, the linking between a revision and a variant is changeable by the user. This is shown more clearly in FIG. 6 where the versioning database of FIG. 5 is shown after the creation of a new revision, revision 600. In FIG. 6, it may be seen that the "alpha" variant 504b, is no longer associated with revision 502b, but has now been updated to be associated with the new revision 600.

An important aspect of the present invention, which is related to variants, is the ability of the versioning database 300 to support both predecessor/successor and base/dependent relationships between adjacent revisions. More specifically, it has already been noted that the revision that is inherited by a node 302 within the revisioning database 300 is supplied by the ancestors of the node 302. Since the ancestors of a particular node 302 are fixed at the time of creation of the node 302, the result is that the inherited revision supplied to a particular node 302 is static and unchanging. This type of relationship between a node 302 and its ancestors (i.e. a relationship where the ancestors of the node 302 are defined and fixed at the creation of the node 302) is described as a predecessor/successor relationship.

The present invention also allows the creator of a new node 302 to specify that the ancestor of the node 302 will be defined in a dynamic fashion known as a base/dependent relationship. This second type of relationship is better understood by reference now to FIG. 7. More specifically, in FIG. 7, a versioning database is shown and generally designated 700. Versioning database 700 includes four revisions: an initial revision 702a, and three descendent revisions 702b, 702c and 702d. Revision 702d has, as ancestors, revision 702b and revision 702. The parent of node 702d, node 702b has an associated variant "master" 704. It is assumed, for the sake of illustration, that a base/dependent relationship was specified during the creation of node 702d. As a result, the parent of node 702d, node 702b is the "base" while node 702d is the "dependent." The variant "master" 704, is known as a "base variant."

Figure 7:
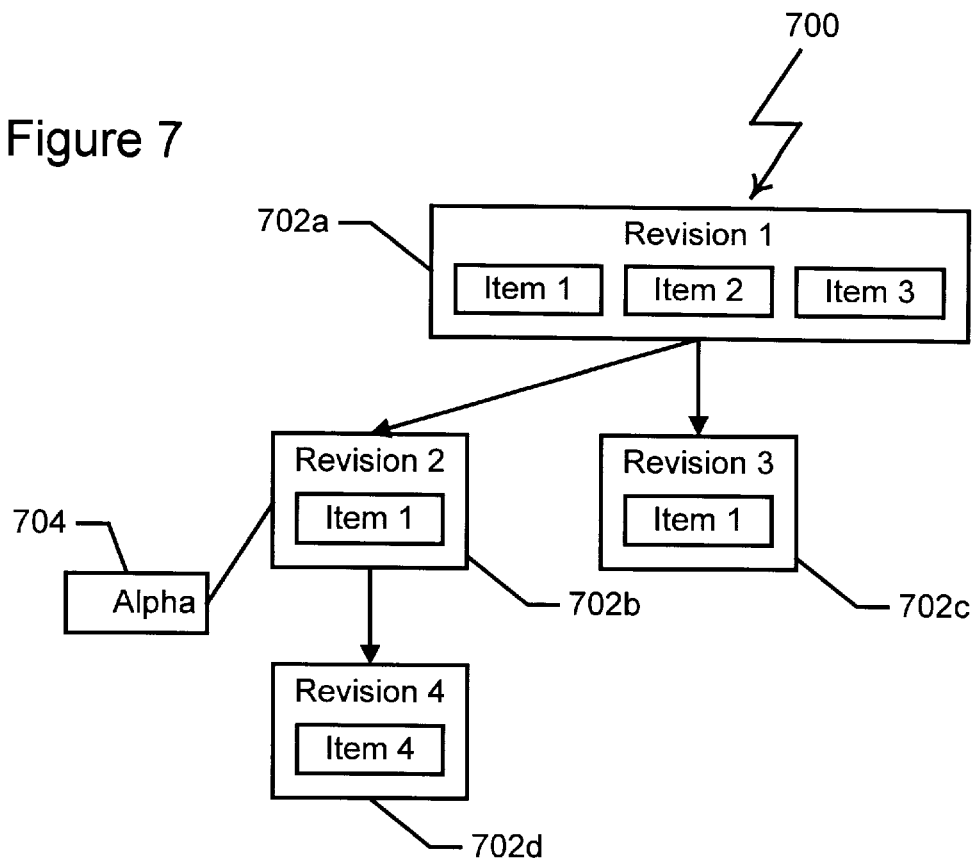
FIG. 7 is a schematic diagram illustrating the base/dependent relationship within the revisioning database of the present invention.
Figure 8:
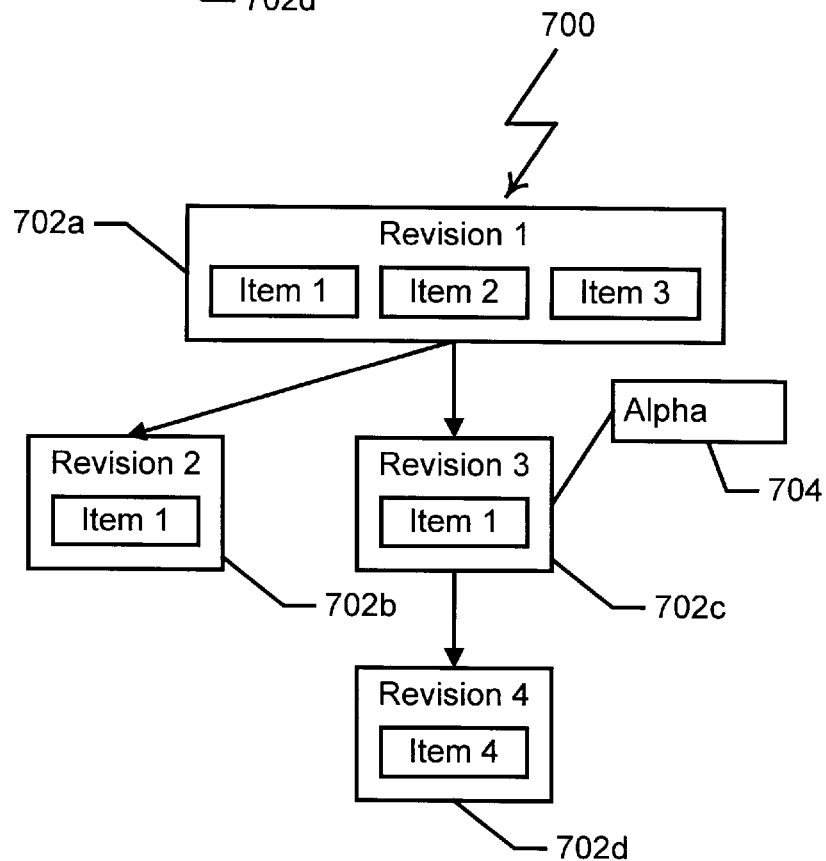
FIG. 8 is a schematic diagram illustrating the effect of reassociating a variant within the base/dependent relationship of FIG. 7.

FIG. 8 shows substantially the same versioning database 700 as just described in regard to FIG. 7. In FIG. 8, however, the variant "master" 704 has been reassociated. As a result, the variant "master" 704 is associated, not with node 702b, but with node 702c. At the same time, it may be seen that node 702d, which was formerly a descendent of node 702b, is now a descendent of node 702c. In other words, it may be stated that the node 702d has dynamically changed ancestors to follow the shifting of variant "master" 704 from node 702b to node 702c. In fact, for the present invention, the parent of node 702d will change to any node 702d that becomes associated with the variant "master." This change in ancestors changes the revision which the present invention defines using node 702d. At the same time, if additional revisions are added as descendent nodes 702 of node 702d they will also be subject to the dynamically changing revision that is defined using node 702d.

The present invention specifically includes an article of manufacture, which is a computer readable medium such as a floppy disk, optical disk, or hard drive, etc., storing the naming graph 200, or the versioning database 300 as described in the preceding paragraphs.

The present invention also include a method for constructing the versioning database 300 which is shown in the form of the flowchart 800 of FIG. 8. In more detail, it may be seen that the method for constructing the versioning database starts, in step 902, with the creation of a database object. In general, in a distributed object computing system, as well as within other object oriented methodologies, creation of an object is performed by calling the object's constructor. The constructor allocates the required space and initializes required data elements. When the constructor is done, the database object is returned, ready for operation.

Step 902 is followed by step 904 in which the name/attribute pairs which define the initial revision are selected. This selection is dependent, of course, entirely on the end use for which the versioning database will be used. It should be appreciated that the present invention is intended to support any data object which may be manipulated by a computer system.

Step 906, which follows, requires the creation of an initial revision. In terms of the revisioning database 300 of FIG. 3, this corresponds to the creation of the root node 302a. For the present invention, the contents of a new revision are not publicly available until construction of the revision is complete. In general, whenever a new node is created, the creator must specify either the predecessor/successor or base/dependent relationship. In the case of the root node 302, however, there are no ancestors, so the choice of predecessor/successor or base/dependent relationship is irrelevant.

In the following step, step 908, each name/attribute pair selected in step 904 is added to the revision created in step 906. Adding the name/attribute pairs generally involves calling a method associated with the node to which the name/attribute pairs are to be added.

When all name/attribute pair have been added, the revision is ended in step 910. Once ended, the contents of the revision are no longer changeable, and the revision becomes publicly available to users of the revisioning database. At the completion of step 910 a revisioning database exists which contains a single node defining the initial revision.

In Step 912, which follows step 910, name/attribute pairs are selected for a new revision. The selected names/attribute pairs may be changed versions of the name/attribute pairs included in a previous revision, or new names/attribute pairs to be added.

In the following step, step 914, a new revision is created. Once again, the new revision is created by calling a method associated with the revisioning database. The user must specifically choose the revision upon which the new revision is to be based and must specifically choose between the predecessor/successor and base/dependent relationship. Additionally, the user must supply a name to use as the variant of the new revision. Creation of the new revision corresponds to the addition of a descendent node 302 to the revisioning database of FIG. 3.

In the following step, step 916, each name/attribute pair selected in step 912 is added to the revision created in step 914. Adding the name/attribute pairs generally involves calling a method associated with the node to which the name/attribute pairs are to be added.

When all name/attribute pair have been added, the new revision is ended in step 918. Once ended, the contents of the new revision are no longer changeable, and the revision becomes publicly available to users of the revisioning database. As shown in FIG. 9, the steps associated with creating new revisions (i.e. steps 912 through 918) may be repeated an unlimited number of times.

The present invention specifically includes an apparatus which is a computer program for executing the steps of FIG. 9. Additionally, the present invention specifically includes an article of manufacture, which is a computer readable medium such as a floppy disk, optical disk, or hard drive, etc., storing computer executable codes for performing the method of FIG. 9.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A method for providing a hierarchical networked database which supports multiple versions of the same underlying data, the method comprising the steps of:

providing one or more name/attribute pairs, the name/attribute pairs defining an initial version;

storing the name/attribute pairs of the initial version in the root node of a tree-like data structure;

creating one or more revisions to the initial version, each revision including one or more changed name/attribute pairs;

storing the changed name/attribute pairs of each revision in a separate node; and storing each node in the tree-like data structure as a descendent of the root node.

2. A method as recited in claim 1 further comprising the steps of:

choosing a node in the tree-like data structure;

making a revision to the name/attribute pairs contained in the node and its ancestors, the revision including one or more changed name/attribute pairs;

storing the changed name/attribute pairs of the revision in a node; and storing the node in the tree-like data structure as a descendent of the node.

3. A method as recited in claim 2 further comprising the steps of:

choosing a second node in the tree-like data structure; and associating a variant with the second node, a variant being a symbolic name.

4. A method as recited in claim 2 further comprising the steps of:

choosing a second node in the tree-like data structure, the second chosen node being associated with a variant, the second chosen node having one or more descendent nodes;

removing the association between the second chosen node and the variant;

associating the variant with a third chosen node in the tree-like data structure; and re-linking each descendent node of the second chosen node to be a descendent node of the third chosen node.

5. A method as recited in claim 2 further comprising the steps of:

choosing a second node in the tree-like data structure;

creating a revision chain list, the revision chain list being a linked list which includes, in order, the second chosen node and each ancestor of the second chosen node.

6. A method as recited in claim 5 further comprising the step of providing the contents of a revision by traversing the revision chain list and returning the first instance of each name/attribute pair contained in a node in the revision chain list.

7. An apparatus for manipulating a hierarchical networked database which supports multiple versions of the same underlying data, the apparatus comprising:
- a first computer executable means for creating the root node of a tree-like data structure, the root node containing one or more name/attribute pairs defining an initial revision;
- a second computer executable means for creating one or more descended nodes, each descendent node inheriting the revision associated with the parent of the descendent node, each descendent node containing one or more changed name/attribute pairs, the changed name/attribute pairs contained in each node in combination with the revision inherited by the descendent node defining a new revision associated with the descendent node.

8. An apparatus as recited in claim 7 which further comprises a third computer executable means for associating a variant with a chosen node in the tree-like data structure.

9. An apparatus as recited in claim 8 which further comprises:
- a fourth computer executable means for removing the association between the variant and the chosen node, and associating the variant with a second chosen node in the tree-like data structure; and
- a fifth computer executable means for re-linking each descendent node of the chosen node to be a descendent node of the second chosen node.

10. An apparatus as recited in claim 9 which further comprises a sixth computer executable means for creating a revision chain list, the revision chain list being a linked list which includes, in order, a chosen node and each ancestor of the chosen node.

11. An apparatus as recited in claim 10 which further comprises a seventh computer executable means for providing the contents of a revision by traversing the revision chain list and returning the first instance of each name/attribute pair contained in a node in the revision chain list.

* * * * *